(12) United States Patent
Winter (10) Patent No.: US 12,496,535 B2
(45) Date of Patent: Dec. 16, 2025

(54) LABORATORY GLASSWARE

(71) Applicant: Rolf Winter, Portland, OR (US)

(72) Inventor: Rolf Winter, Portland, OR (US)

( * ) Notice: Subject to any disclaimer, the term of this patent is extended or adjusted under 35 U.S.C. 154(b) by 324 days.

(21) Appl. No.: 17/980,168

(22) Filed: Nov. 3, 2022

(65) Prior Publication Data

US 2024/0149187 A1 May 9, 2024

(51) Int. Cl.
*B01D 5/00* (2006.01)
(52) U.S. Cl.
CPC ................................. *B01D 5/0063* (2013.01)
(58) Field of Classification Search
CPC ..................... B01D 5/006–0066; B01D 5/00
See application file for complete search history.

(56) References Cited

U.S. PATENT DOCUMENTS

| | | | |
|---|---|---|---|
| 2,251,185 A | 7/1941 | Carter et al. | |
| 2,427,142 A | 9/1947 | Hornbacher et al. | |
| 2,537,942 A | 1/1951 | Martin | |
| 2,539,082 A | 1/1951 | Hustinx | |
| 2,573,807 A | 11/1951 | Piros et al. | |
| 3,257,170 A | 6/1966 | Marcus et al. | |
| 3,395,083 A | 7/1968 | Gilmont | |
| 3,607,662 A | 9/1971 | Glover | |
| 3,744,656 A | 7/1973 | Wolfram | |
| 3,907,683 A | 9/1975 | Gilmont | |
| 3,927,342 A | 12/1975 | Bode et al. | |
| 4,072,243 A | 2/1978 | Conant et al. | |
| 4,305,382 A | 12/1981 | Nott | |
| 4,333,523 A | 6/1982 | Hartzler | |
| 4,724,048 A * | 2/1988 | Helmich | B01D 3/42 159/44 |
| 4,770,854 A | 9/1988 | Lyman | |
| D307,869 S | 5/1990 | Miskinis | |
| D312,128 S | 11/1990 | Headley | |
| 5,178,817 A | 1/1993 | Yamada et al. | |
| 5,271,085 A | 12/1993 | Carballo | |
| 5,478,478 A | 12/1995 | Griswold | |
| 5,591,310 A | 1/1997 | Olrik | |
| 5,823,391 A | 10/1998 | Klauke et al. | |
| 5,931,323 A | 8/1999 | Wilkinson et al. | |
| 6,006,960 A | 12/1999 | Gross | |
| 6,332,494 B1 | 12/2001 | Bodas et al. | |
| 6,557,351 B1 | 5/2003 | Ghedini et al. | |
| 8,080,092 B2 | 12/2011 | Hecht et al. | |

(Continued)

FOREIGN PATENT DOCUMENTS

| | | | | |
|---|---|---|---|---|
| CN | 110772827 A * | 2/2020 | ............. | B01D 49/00 |
| WO | WO-2021047537 A1 * | 3/2021 | ........... | B01D 1/0017 |

OTHER PUBLICATIONS

English machine translation of CN 110772827 (Year: 2020).*

*Primary Examiner* — Renee Robinson
(74) *Attorney, Agent, or Firm* — King & Partners, PLC (57) ABSTRACT

A waterless, non-jacketed, laboratory reflux condenser for use in association with a reaction vessel, including: (a) a top portion, wherein the top portion is adapted to serve as a vapor vent; (b) a bottom portion, wherein the bottom portion is adapted for releasable securement to a reaction vessel; (c) a primary condenser; (d) a secondary condenser; and (e) wherein the primary condenser is preferably in-line with the top and bottom portions of the reflux condenser, and the secondary condenser is preferably offset relative to the primary condenser.

16 Claims, 7 Drawing Sheets

(56) References Cited

U.S. PATENT DOCUMENTS

| | | | |
|---|---|---|---|
| D655,801 S | 3/2012 | Russell et al. | |
| D787,034 S | 5/2017 | Showole | |
| D802,108 S | 11/2017 | Birchler et al. | |
| 9,897,353 B2 | 2/2018 | Szabo et al. | |
| D823,253 S | 7/2018 | Chen et al. | |
| 10,471,371 B2 | 11/2019 | Conneway et al. | |
| D901,386 S | 11/2020 | Chen et al. | |
| 11,045,742 B2 | 6/2021 | Wunz et al. | |
| D930,185 S | 9/2021 | Winter | |
| 11,491,479 B2 | 11/2022 | Winter | |
| 2005/0132780 A1 | 6/2005 | Keen | |
| 2012/0107196 A1 | 5/2012 | Perlman | |
| 2019/0112567 A1 | 4/2019 | Scibek et al. | |
| 2019/0127674 A1 | 5/2019 | Lacey | |
| 2019/0283191 A1* | 9/2019 | Singh | F28F 1/003 |
| 2022/0184521 A1* | 6/2022 | Wen | B01D 3/02 |

\* cited by examiner

Prior Art

Figure 7

LABORATORY GLASSWARE

CROSS-REFERENCE TO RELATED APPLICATIONS

This application relates to U.S. application Ser. No. 29/844,497, entitled "LABORATORY GLASSWARE," filed Jun. 29, 2022, which is hereby incorporated herein by reference in its entirety, including all references cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to laboratory glassware, and, more particularly to, reflux condensers for use in association with, for example, single-neck flasks, multi-neck flasks, reaction vessels, etcetera. The reflux condensers of the present invention are, among other things, stackable, non-jacketed, waterless (i.e., no leaks from open/closed coolant loop), low-profile (i.e., not tall so can easily fit in a conventional hood), non-rollable (i.e., do not roll on/off the counter), optionally fingerless and/or void of a drip tube (i.e., omits fragile components), and free from metal wrapping (i.e., can be placed in a traditional base bath, or chromic acid bath, etcetera, for cleaning).

2. Background Art

Laboratory glassware and condensers have been known in the art for years, and are the subject of a plurality of patents including, for example: U.S. Pat. No. 11,045,742 entitled "Temperature Controlled Purification Module and Method," U.S. Pat. No. 10,471,371 entitled "Reflux Condenser Method," U.S. Pat. No. 9,897,353 entitled "Hybrid Condenser," U.S. Pat. No. 8,080,092 entitled "Reflux Condenser Apparatus and Method," U.S. Pat. No. 6,332,494 entitled "Air-Cooled Condenser," U.S. Pat. No. 5,591,310 entitled "Distillation," U.S. Pat. No. 4,333,523 entitled "Reflux Condenser," U.S. Pat. No. 4,305,382 entitled "Self-Contained Reflux Condenser Solar Water Heater," U.S. Pat. No. 3,907,683 entitled "Multi-Tubular Constant Head Reflux Condenser," and U.S. Pat. No. 3,607,662 entitled "Fractional Distillation Apparatus Having Vapor Flow Control Means for Alternate Condensers"—all of which are hereby incorporated herein by reference in their entirety including all references cited therein.

U.S. Pat. No. 11,045,742 appears to disclose a purification module configured to separate and purify a liquid solution. The purification module may include a vessel configured to receive a predetermined amount of a liquid solution. The purification module may also include a heating apparatus configured to apply heat to the vessel at a temperature of a first boiling point, and a column apparatus configured to separate the liquid solution into a first liquid and a second liquid and purify the first liquid and the second liquid to a determined purity level. The column apparatus may include a first heating chamber, a second heating chamber, and a distillation chamber. The distillation chamber may be located between the first heating chamber and the second heating chamber. The first heating chamber and second heating chamber may be configured to receive a heat transfer liquid to apply heat to the distillation chamber at the temperature of the first boiling point.

U.S. Pat. No. 10,471,371 appears to disclose methods, apparatus, and processes for a condenser including flowing a vapor stream including formaldehyde into a tube bundle in a vertical up flow reflux condenser, where a tube in the tube bundle has a length to outside diameter ratio of greater than about 170:1, flowing a cooling fluid on a shell-side of the vertical up flow reflux condenser to condense at least a portion of the vapor stream, where the condensed portion of the vapor stream forms a wetted tube internal surface area on each tube in the generally upright tube bundle, and maintaining the vapor stream velocity at a rate that provides a liquid residence time where formaldehyde condensed on the wetted internal surface area of each tube can react with water to form methylene glycol, removing at least sixty percent (60%) of formaldehyde from the vapor stream fed to the condenser.

U.S. Pat. No. 9,897,353 appears to disclose a hybrid condenser having a direct contact condenser segment and a surface condenser segment arranged in a common condensation space. The hybrid condenser includes a surface condenser segment arranged downstream the direct contact condenser segment in the direction of steam flow or below the direct contact condenser segment, and a water guiding element ensuring that the cooling water and condensate mixture generated in the direct contact condenser segment flows downward avoiding the surface condenser segment.

U.S. Pat. No. 8,080,092 appears to disclose a reflux condenser and a method for conducting away liquid from the lower region of reflux passages. The reflux condenser has at least one heat exchanger block which has reflux passages and refrigerant passages, and a pressure container which encloses the heat exchanger block at the top and laterally. The reflux passages communicate at their lower end with a header which is arranged below the heat exchanger block and has a phase-separating device.

U.S. Pat. No. 6,332,494 appears to disclose an air-cooled condenser which includes an upper header for distributing a vaporous medium to be condensed, a lower header for collecting condensate, spaced finned tubes with outer fins, the finned tubes being connected in parallel between the upper header and the lower header and cooled by a cooling air flow, means for draining the condensate from the lower header and extraction means for removing non-condensable gases from the condenser. The lower header is also used for distributing the vaporous medium to the finned tubes, so that the vaporous medium is fed into the finned tubes through both the upper and lower headers, and the extraction means are connected to each of the finned tubes at its portion facing the cooling air flow.

U.S. Pat. No. 5,591,310 appears to disclose an apparatus for distillation of a liquid near or above its critical point wherein the liquid contains a dissolved solid. The apparatus includes a separation section wherein the liquid may be separated into a vapor and a liquid residue separated by a liquid surface. The apparatus includes a pump for pumping liquid into the apparatus so as to establish and maintain the liquid and vapor in the separation section at a desired pressure and a heat source for heating the liquid and vapor so as to establish a rising temperature profile in the separation section. The pump and heat source are cooperatively controllable for regulating the position of the liquid surface so that liquid residue can be discharged from immediately below the liquid surface.

U.S. Pat. No. 4,333,523 appears to disclose a novel apparatus for use in the rapid refluxing of low boiling liquids. The apparatus comprises a central chamber for the reception of hot gases from a reaction vessel, the chamber being surrounded by a cooling jacket. The central chamber comprises a lower primary condenser of two or more bulbous portions connected to and in fluid communication with each other and with a curvilinear column serving as a secondary condenser.

U.S. Pat. No. 4,305,382 appears to disclose an apparatus and method for heating water by reflux condensation wherein a solar vaporized heat transfer fluid passes through a condenser in heat exchange relationship with a volume of water. The collection of solar radiation is affected in a primary solar collection region elevated above the condenser. The invention disclosed provides for the recirculation of condensed heat transfer fluid from condenser to the primary collection region. Sequentially, this entails passing condensate by gravity from the condenser into a U-type trap for accumulation until excess condensate causes some spill-over and flow by gravity of condensate into a booster solar collection region, through a venturi. In the booster region spill over condensate flash vaporizes and is channeled in reverse through the venturi. The velocity of the vapor in the venturi creates low pressure according to the venturi effect, thereby drawing condensate accumulated in the trap into the venturi. Condensate so drawn into the venturi is lifted upward by the booster generated vapor into the primary collector for distribution and re-vaporization. This cycle will repeat intermittently like the percolation of water in a coffee pot.

U.S. Pat. No. 3,907,683 appears to disclose a multi-tubular constant head reflux condenser for use with distillation apparatus, feed liquid is passed in heat-transfer relationship with vaporized feed liquid from the distillation apparatus to condense the vaporized feed liquid as distillate and to preheat the feed liquid almost to its boiling point prior to its entry into the distillation apparatus. A vent is provided through which the impurities volatilized by such preheating of the feed liquid can escape, and the temperature and flow rate of the feed liquid being discharged from the condenser to the distillation apparatus is controlled by a valve in the condenser through which the feed liquid is passed at a constant fluid pressure head. After a single distillation in glass distillation apparatus the quality of the distilled water is as high as 90-95 percent of conductivity water.

U.S. Pat. No. 3,607,662 appears to disclose a laboratory distillation apparatus suitable for operation over wide temperature and pressure ranges to permit distillation of materials regardless of their state at room temperature. A vapor from the charge passes through a distillation column containing a packing material and then enters an overhead fractionating condenser. The condensate drops onto the packing, and contact rectification causes more complete separation of the vapor components. When an equilibrium condition is reached, the input to the fractionating condenser is closed and an input is opened to an overhead receiving condenser. The vapor then condenses and passes to a receiver. A temperature-control fluid surrounds the two condensers to ensure that the material in them remains in the liquid state. Connections are provided for a vacuum pump to permit operation under reduced pressure.

While the above-identified patents and/or publications appear to disclose various types of condensers, their configurations remain non-desirous and/or problematic inasmuch as, among other things, none of the above-identified references appear to disclose a reflux condenser that is stackable, non-jacketed, waterless, low-profile, non-rollable, optionally fingerless, and free from metal wrapping.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a waterless, non-jacketed, laboratory reflux condenser for use in association with a reaction vessel, comprising, consisting essentially of, and/or consisting of: (a) a top portion, wherein the top portion is adapted to serve as a vapor vent; (b) a bottom portion, wherein the bottom portion is adapted for releasable securement to a reaction vessel; (c) a primary condenser; (d) a secondary condenser; and (e) wherein the primary condenser is preferably in-line with the top and bottom portions of the reflux condenser, and the secondary condenser is preferably offset relative to the primary condenser.

In a preferred embodiment of the present invention, the primary and/or secondary condensers comprise smooth columnar condensers/portions, Vigreux condensers/portions (e.g., a plurality of indentations and/or fingers) and/or include one or more bulbous portions.

In another preferred embodiment of the present invention, the reflux condenser further comprises a tertiary condenser. In this embodiment, the tertiary condenser preferably includes a smooth columnar condenser/portion, a Vigreux condenser/portion (e.g., a plurality of indentations and/or fingers) and/or one or more bulbous portions.

In yet another preferred embodiment of the present invention, the reflux condenser further comprises a quaternary condenser. In this embodiment, the quaternary condenser preferably includes a smooth columnar condenser/portion, a Vigreux condenser/portion (e.g., a plurality of indentations and/or fingers) and/or one or more bulbous portions.

In one preferred embodiment of the present invention, the reflux condenser further comprises a quinary condenser. In this embodiment, the quinary condenser preferably includes a smooth columnar condenser/portion, a Vigreux condenser/portion (e.g., a plurality of indentations and/or fingers) and/or one or more bulbous portions.

In a preferred implementation of the present invention, the bottom portion of the reflux condenser includes at least one condensate collection finger attached thereto.

In another preferred implementation of the present invention, each one of the condensers includes an aperture at upper and lower portions thereof.

In yet another preferred implementation of the present invention, each one of the condensers includes at least one condensate collection finger attached thereto.

The present invention is also directed to a waterless, non-jacketed, laboratory reflux condenser for use in association with a reaction vessel, comprising, consisting essentially of, and/or consisting of: (a) a top portion, wherein the top portion is adapted to serve as a vapor vent; (b) a bottom portion, wherein the bottom portion is adapted for releasable securement to a reaction vessel; (c) a primary condenser; a secondary condenser; a tertiary condenser; a quaternary condenser; and a quinary condenser; and (d) wherein the primary condenser is in-line with the top and bottom portions of the reflux condenser, and the secondary, tertiary, quaternary, and quinary condensers are offset relative to the primary condenser.

In a preferred embodiment of the present invention, the primary condenser, the secondary condenser, the tertiary condenser, the quaternary condenser, and the quinary condenser each independently include a smooth columnar condenser/portion, a Vigreux condenser/portion (e.g., a plurality of indentations and/or fingers) and/or one or more bulbous portions.

In another preferred embodiment of the present invention, the bottom portion includes at least one condensate collection finger attached thereto.

In yet another preferred embodiment of the present invention, each one of the condensers includes an aperture at upper and lower portions thereof.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

The invention will now be described with reference to the drawings wherein.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters.

Referring now to the drawings, and to FIGS. 1-6 in particular, reflux condenser 10 is shown as generally comprising top portion 12, bottom portion 14, primary condenser 16, secondary condenser 18, optional tertiary condenser 20, optional quaternary condenser 22, and optional quinary condenser 24. Additional condensers (e.g., 6, 7, 8, 9, 10, 11, 12, 13, 14, 15, 20, etcetera) may be used in accordance with the present invention. Preferably, each condenser includes one or more (e.g., 1, 2, 3, 4, 5, 6, 7, 8, 9, 10, etcetera) bulbous portions/regions 26. Reflux condenser 10 of the present invention is, among other things, stackable (i.e., you can vertically stack multiple condensers on top of each other), non-jacketed, waterless, low-profile, non-rollable, optionally fingerless and/or void of a drip tube, and free from metal wrapping.

Top portion 12 is preferably adapted to serve as a vapor vent and/or stacking component. Top portion 12 also preferably comprises aperture 28 for receiving a stopper, an adapter, a connector, and/or an additional piece of glassware (not shown).

Bottom portion 14 is preferably adapted for releasable securement to a reaction vessel and/or serves as a stacking component. Bottom portion 14 also preferably includes at least one condensate collection finger or drip tube 30 attached thereto. In this embodiment the collection fingers terminate with stem 32.

Primary condenser 16 is preferably positioned in-line with the top and bottom portions of the reflux condenser, and secondary condenser 18 (as well as optional tertiary, quaternary, and quinary condensers) is/are offset relative to primary condenser 16.

In accordance with the present invention, each one of the condensers preferably includes apertures 28 at upper and lower portions thereof.

In one embodiment of the present invention, reflux condenser 10 is preferably fabricated (e.g., hand blown) from one or more pieces of glass, such as, but not limited to, soda-lime glass, lead glass, borosilicate glass, aluminosilicate glass, silica glass, and fused silica glass—just to name a few.

Figure 1:
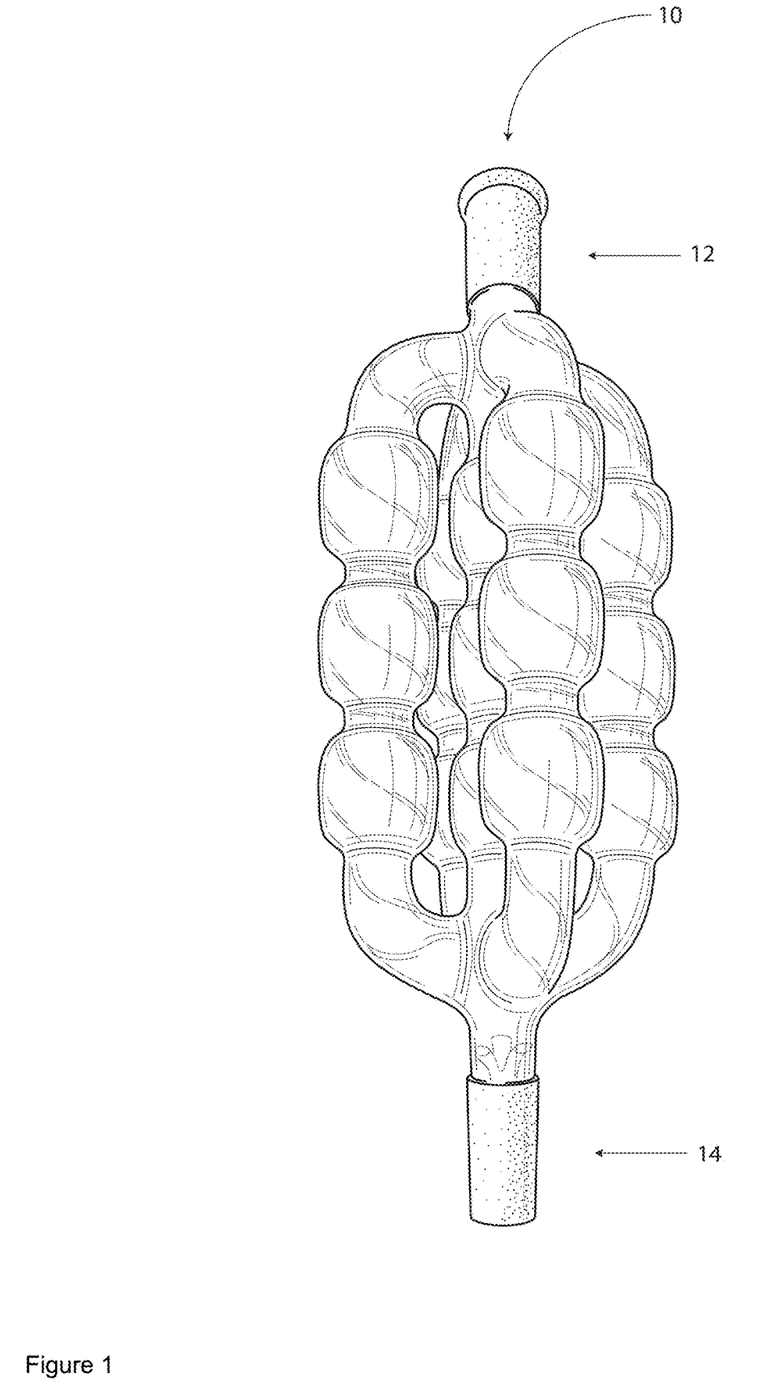
FIG. 1 of the drawings is a perspective view of a reflux condenser fabricated in accordance with the present invention.
Figure 2:
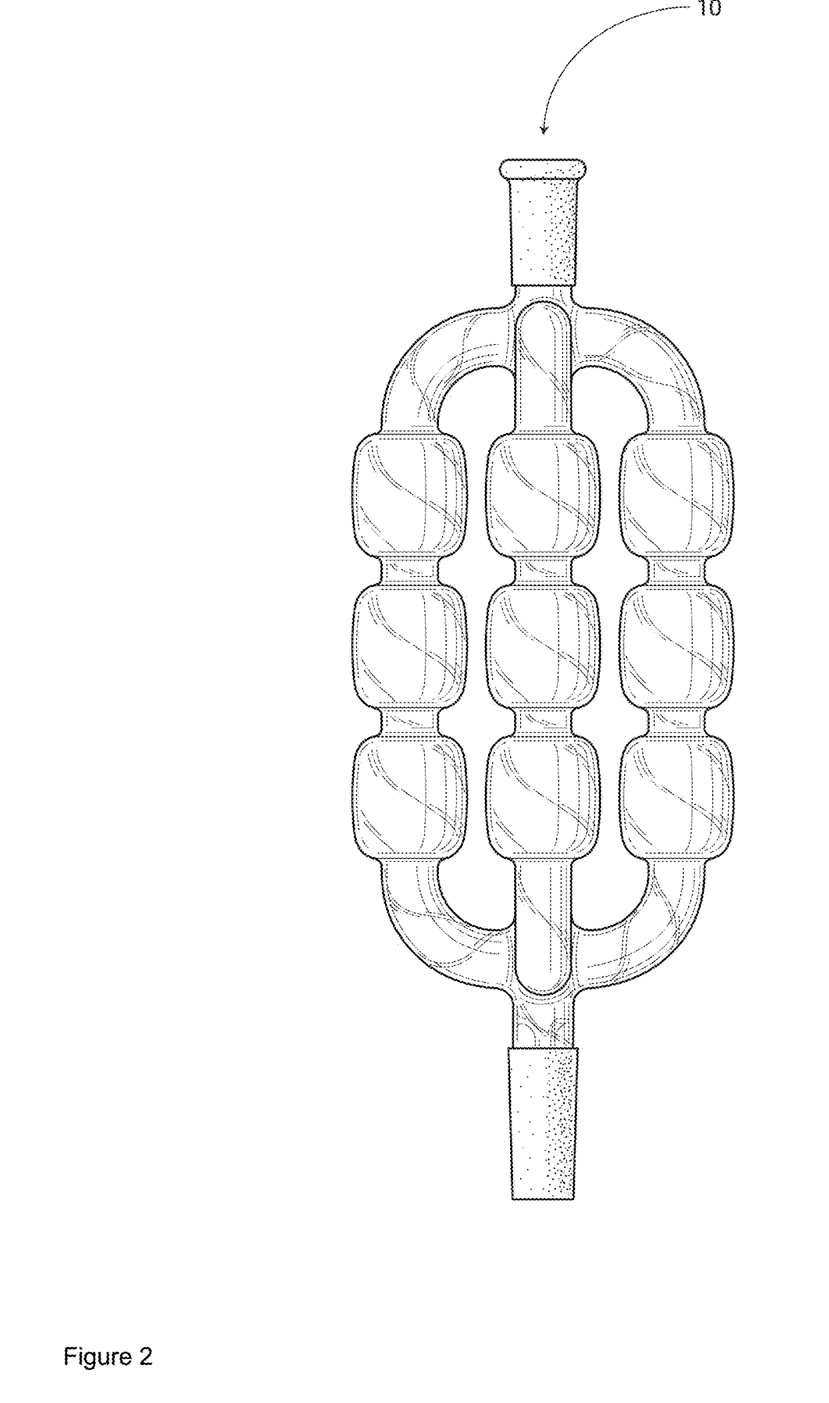
FIG. 2 of the drawings is a front view of the reflux condenser of FIG. 1.
Figure 3:
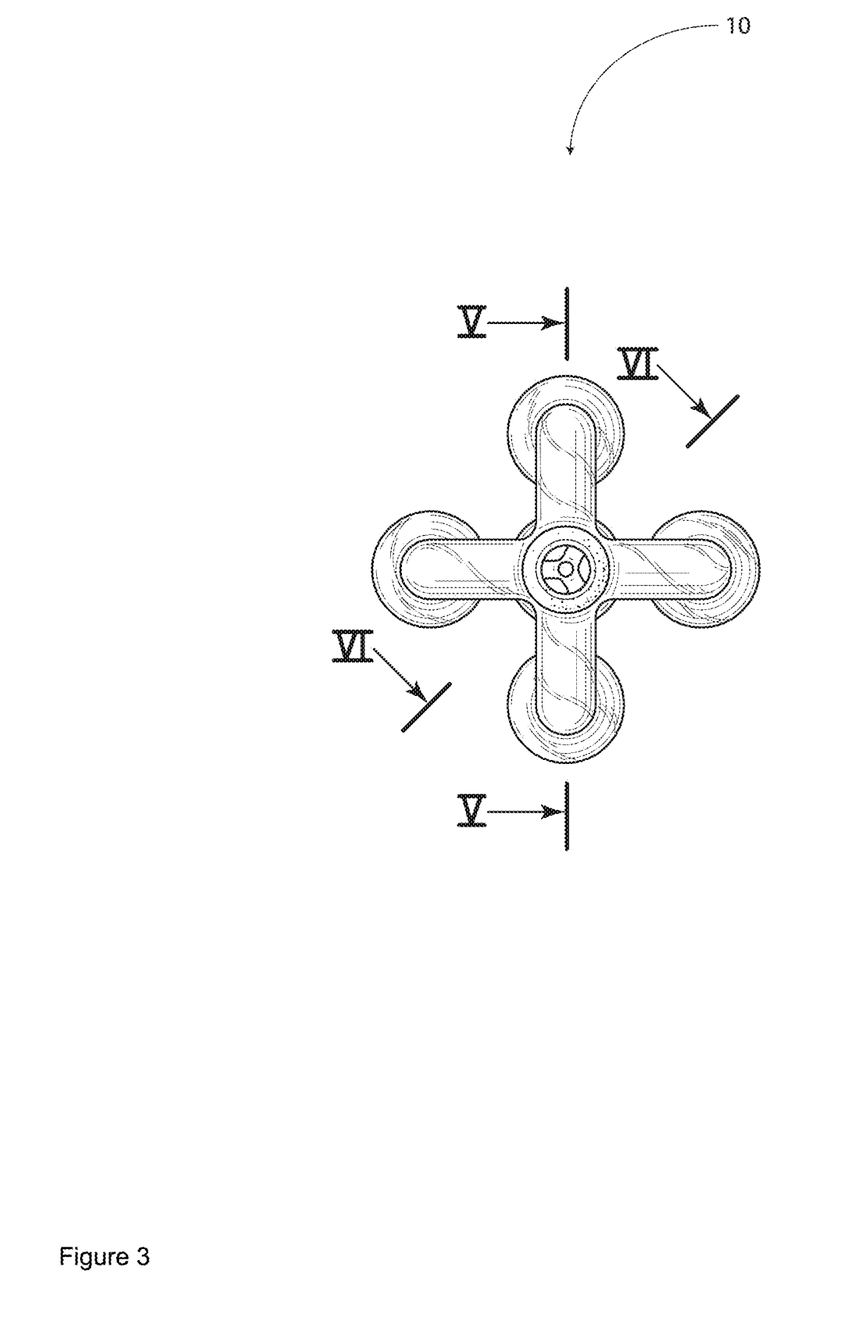
FIG. 3 of the drawings is a top plan view of the reflux condenser of FIG. 1.
Figure 4:
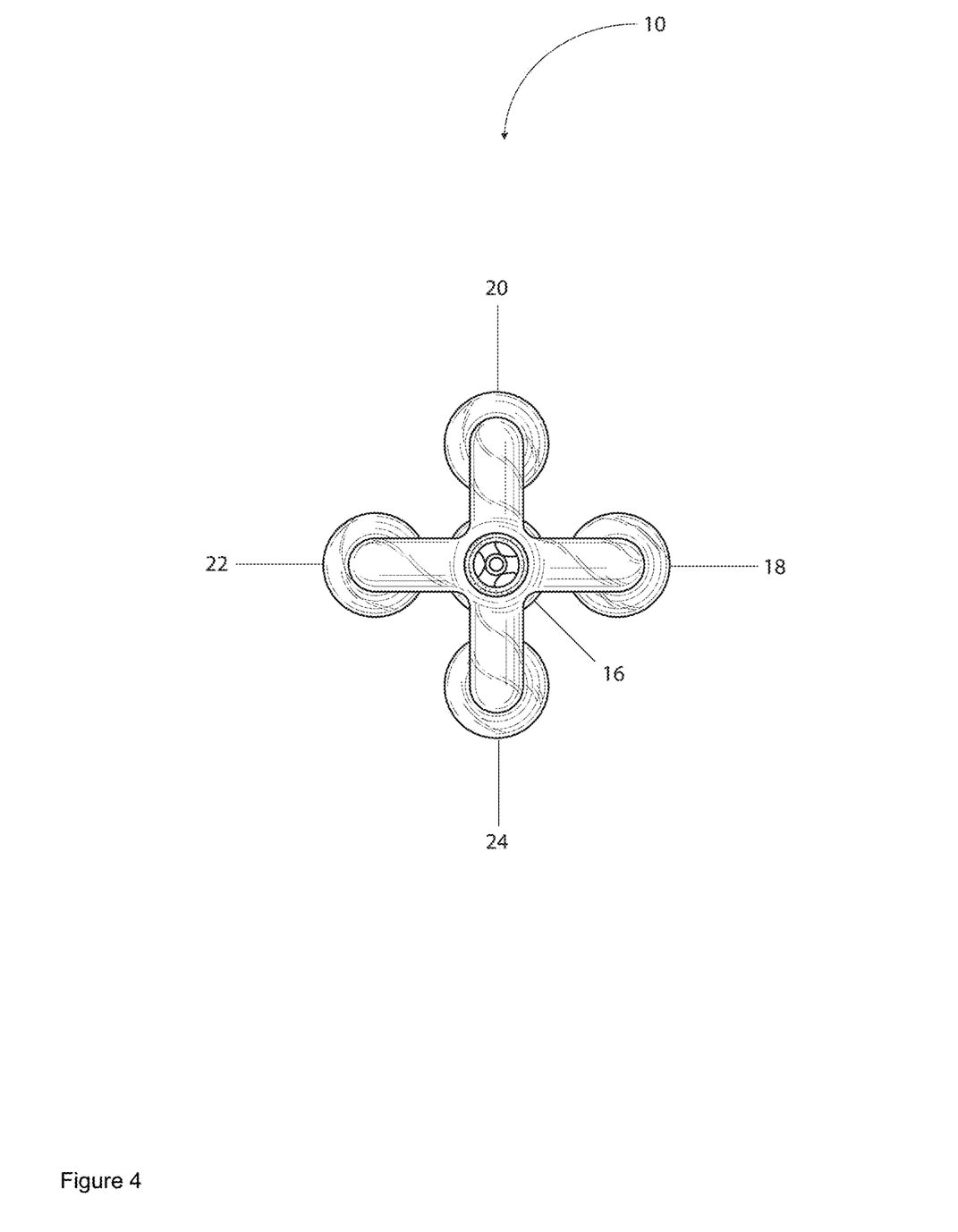
FIG. 4 of the drawings is a bottom plan view of the reflux condenser of FIG. 1.
Figure 5:
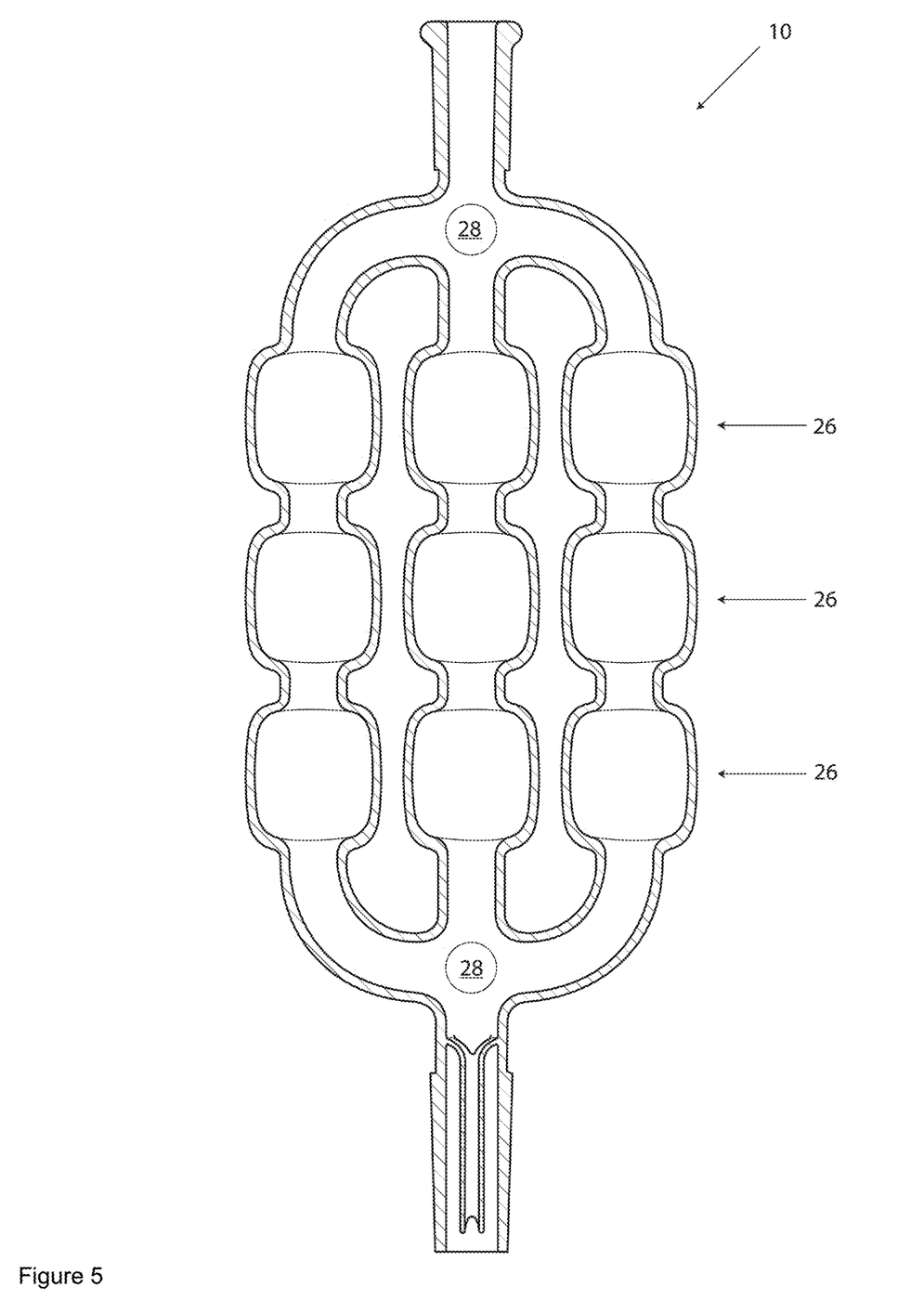
FIG. 5 of the drawings is a cross-sectional view of the reflux condenser taken along line V of FIG. 3.
Figure 6:
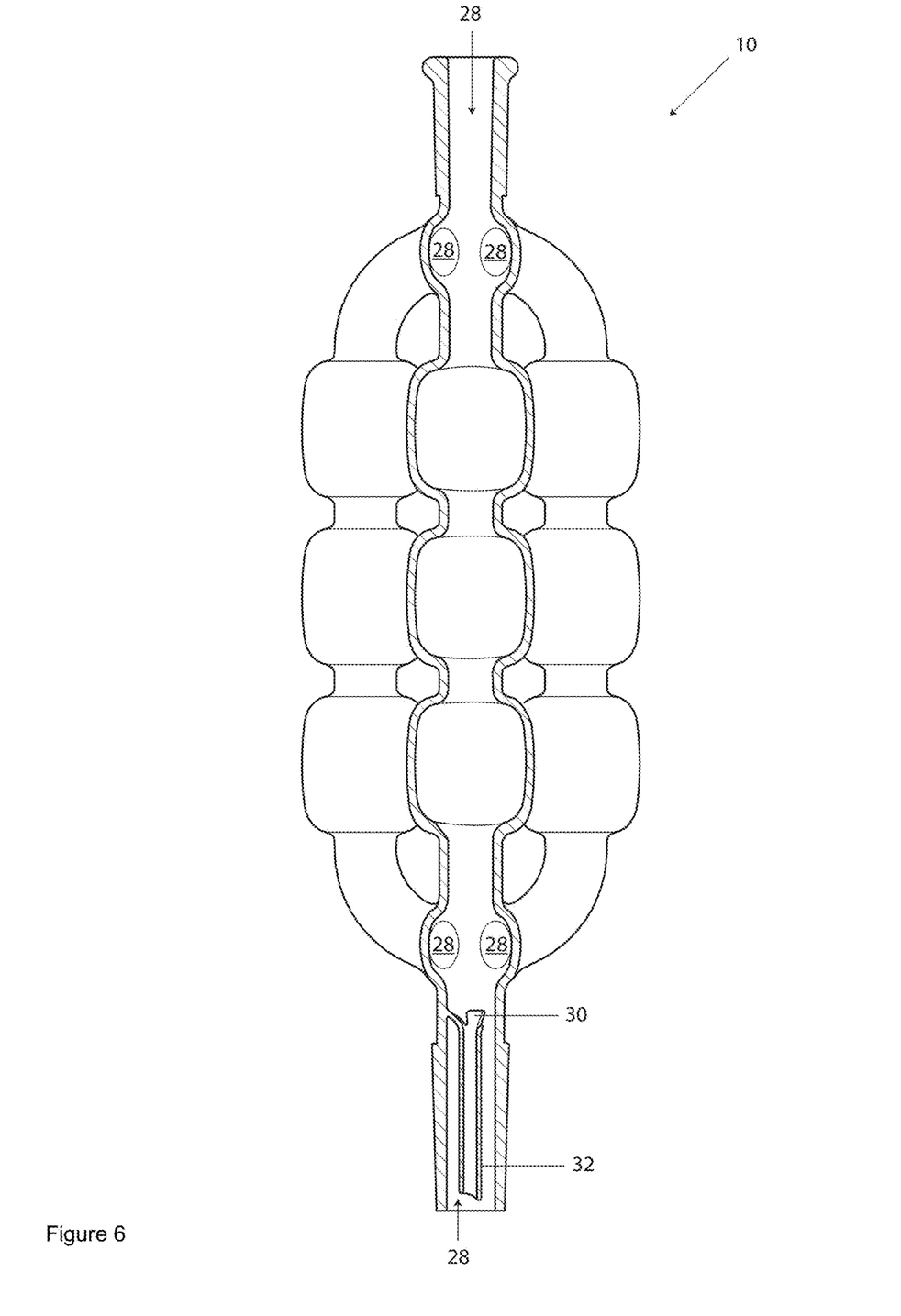
FIG. 6 of the drawings is a cross-sectional view of the reflux condenser taken along line VI of FIG. 3.
Figure 7:
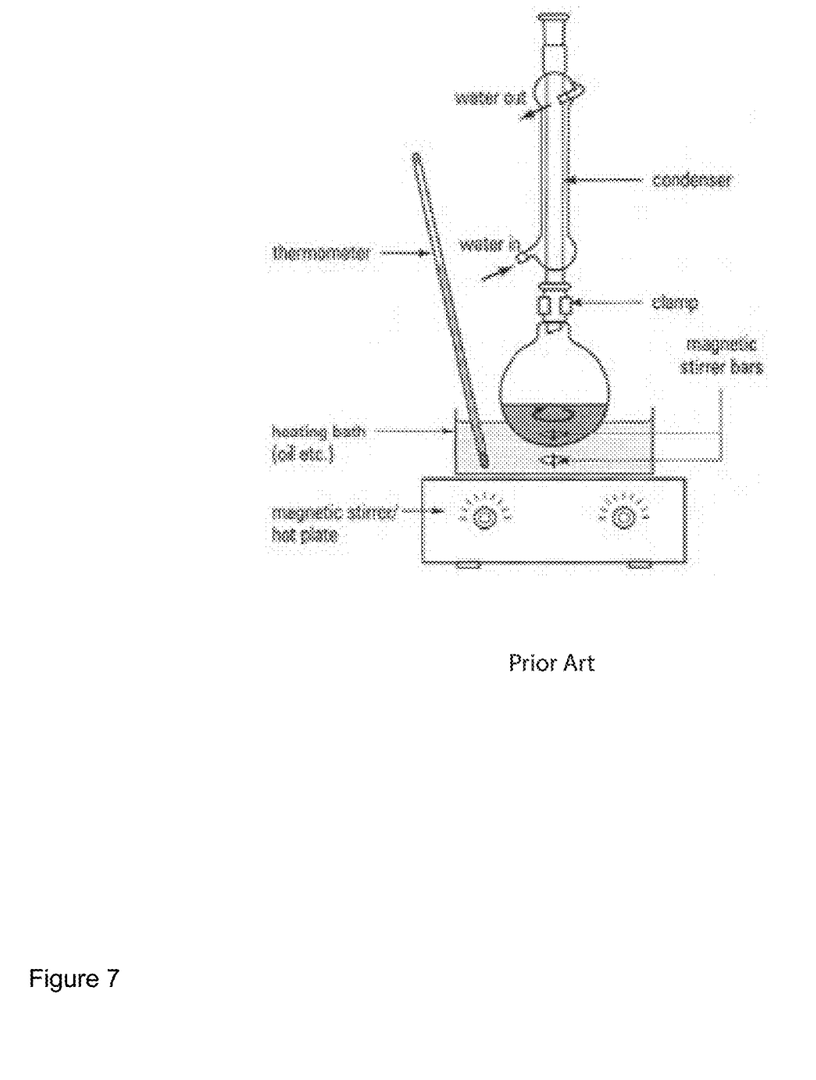
FIG. 7 of the drawings is a front view of a traditional, prior art reflux condenser associated with a reaction vessel.

Reflux condenser 10 of the present invention is intended to replace the traditional, prior art reflux condenser associated with a reaction vessel shown in FIG. 7.

It will be understood that either a portion of or the entire inner and/or outer surfaces of reflux condenser 10 may be chemically and/or mechanically etched.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein, have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A waterless, non-jacketed, laboratory reflux condenser for use in association with a reaction vessel, comprising:
    a top portion, wherein the top portion is adapted to serve as a vapor vent;
    a bottom portion, wherein the bottom portion is adapted for releasable securement to a reaction vessel;
    a primary condenser;
    a secondary condenser; and
    wherein the primary condenser is optionally in-line with the top and bottom portions of the reflux condenser, and the secondary condenser is optionally offset relative to the primary condenser, and the primary condenser achieves cooling through air convection without any water-cooling connections.

2. The reflux condenser according to claim 1, wherein the primary condenser includes a smooth columnar condenser/portion, a Vigreux condenser/portion and/or one or more bulbous portions.

3. The reflux condenser according to claim 1, wherein the secondary condenser includes a smooth columnar condenser/portion, a Vigreux condenser/portion and/or one or more bulbous portions.

4. The reflux condenser according to claim 1, further comprising a tertiary condenser.

5. The reflux condenser according to claim 4, wherein the tertiary condenser includes a smooth columnar condenser/portion, a Vigreux condenser/portion and/or one or more bulbous portions.

6. The reflux condenser according to claim 4, further comprising a quaternary condenser.

7. The reflux condenser according to claim 6, wherein the quaternary condenser includes a smooth columnar condenser/portion, a Vigreux condenser/portion and/or one or more bulbous portions.

8. The reflux condenser according to claim 6, further comprising a quinary condenser.

9. The reflux condenser according to claim 8, wherein the quinary condenser includes a smooth columnar condenser/portion, a Vigreux condenser/portion and/or one or more bulbous portions.

10. The reflux condenser according to claim 1, wherein the bottom portion includes at least one condensate collection finger attached thereto.

11. The reflux condenser according to claim 8, wherein each one of the condensers includes an aperture at upper and lower portions thereof.

12. A waterless, non-jacketed, laboratory reflux condenser for use in association with a reaction vessel, comprising:
    a top portion, wherein the top portion is adapted to serve as a vapor vent;
    a bottom portion, wherein the bottom portion is adapted for releasable securement to a reaction vessel;
    a primary condenser; a secondary condenser; a tertiary condenser; a quaternary condenser; and a quinary condenser; and
    wherein the primary condenser is optionally in-line with the top and bottom portions of the reflux condenser, and the secondary, tertiary, quaternary, and quinary condensers are optionally offset relative to the primary condenser, and wherein the condenser achieves cooling through air convection without any water-cooling connections.

13. The reflux condenser according to claim 12, wherein the primary condenser, the secondary condenser, the tertiary condenser, the quaternary condenser, and the quinary condenser each include a smooth columnar condenser/portion, a Vigreux condenser/portion and/or one or more bulbous portions.

14. The reflux condenser according to claim 12, wherein the bottom portion includes at least one condensate collection finger/drip tube attached thereto.

15. The reflux condenser according to claim 12, wherein each one of the condensers includes an aperture at upper and lower portions thereof.

16. A waterless, non-jacketed, laboratory reflux condenser for use in association with a reaction vessel, consisting of:
    a top portion, wherein the top portion is adapted to serve as a vapor vent;
    a bottom portion, wherein the bottom portion is adapted for releasable securement to a reaction vessel;

a primary condenser; a secondary condenser; a tertiary condenser; a quaternary condenser; and a quinary condenser; and wherein the primary condenser is in-line with the top and bottom portions of the reflux condenser, and the secondary, tertiary, quaternary, and quinary condensers are offset relative to the primary condenser.

\* \* \* \* \*